(12) United States Patent
Kasher

(10) Patent No.: US 9,277,498 B2
(45) Date of Patent: Mar. 1, 2016

(54) DEVICE, SYSTEM AND METHOD OF ASSOCIATION BETWEEN WIRELESS COMMUNICATION DEVICES

(75) Inventor: Assaf Kasher, Haifa (IL)

(73) Assignee: INTEL CORPORATION, Sant Clara, CA (US)

( * ) Notice: Subject to any disclaimer, the term of this patent is extended or adjusted under 35 U.S.C. 154(b) by 356 days.

(21) Appl. No.: 13/527,611

(22) Filed: Jun. 20, 2012

(65) Prior Publication Data

US 2013/0343247 A1    Dec. 26, 2013

(51) Int. Cl.
*H04B 7/00*    (2006.01)
*H04B 1/40*    (2015.01)
*H04W 52/02*    (2009.01)
*H04W 72/04*    (2009.01)

(52) U.S. Cl.
CPC ............ *H04W 52/0209* (2013.01); *Y02B 60/50* (2013.01)

(58) Field of Classification Search
CPC . H04W 36/14; H04W 36/0016; H04W 8/005; H04W 84/18; H04W 92/10; H04W 84/22; H04W 88/08; H04W 84/12; H04W 24/02; H04W 48/16; H04W 76/02; H04W 48/18; H04W 48/20; H04W 52/00; H04W 52/02; H04W 52/0235; H04W 84/20; H04W 88/02; H04B 1/71637; H04B 1/719; H04B 7/00; H04B 7/02
USPC .................. 370/311, 328, 329, 245, 252, 254
See application file for complete search history.

(56) References Cited

U.S. PATENT DOCUMENTS

| | | | |
|---|---|---|---|
| 8,275,373 B2 * | 9/2012 | Julian et al. | 455/434 |
| 8,547,920 B2 * | 10/2013 | Chen | 370/329 |
| 2008/0176561 A1 | 7/2008 | Shao et al. | |
| 2011/0053521 A1 * | 3/2011 | Cordeiro | 455/73 |
| 2013/0252548 A1 * | 9/2013 | Levy et al. | 455/41.2 |
| 2013/0329712 A1 * | 12/2013 | Cordeiro et al. | 370/338 |

FOREIGN PATENT DOCUMENTS

| | | |
|---|---|---|
| WO | 2004107784 | 12/2004 |
| WO | 2009116922 | 9/2009 |

OTHER PUBLICATIONS

IEEE 802.11-2007, IEEE Standard for Information Technology—Telecommunications and information exchange between systems—Local and metropolitan area networks—Specific requirements, Part 11: Wireless LAN Medium Access Control (MAC) and Physical Layer (PHY) Specifications; Jun. 12, 2007.

(Continued)

*Primary Examiner* — Charles C Jiang
*Assistant Examiner* — Will Lin
(74) *Attorney, Agent, or Firm* — Shichrur & Co.

(57) ABSTRACT

Some demonstrative embodiments include devices, systems and/or methods of wireless communication. For example, a device may include a wireless communication unit to operate as a first station type selected from the group consisting of a network controller station and a non-network controller station, to associate with a wireless communication device operating as a second station type, different from the first station type, selected from the group consisting of the network controller station and the non-network controller station, and upon performing the association, to switch to operate as the second station type for communicating with the wireless communication device as the first station type.

28 Claims, 4 Drawing Sheets

(56) References Cited

OTHER PUBLICATIONS

Wireless-Gigabit-Alliance (WGA) specifications (Wireless Gigabit Alliance, Inc. WiGig MAC and PHY Specification Version 1.0, Final specification), Apr. 2010.
Wi-Fi Alliance Technical Committee P2P Task Group. Wi-Fi Peer-to-Peer (P2P) Technical Specification. Version 1.2; 160 pages; Dec. 14, 2011.
International Search Report and Written Opinion for PCT Patent Application No. PCT/US2013/033384, mailed on Jun. 28, 2013, 9 pages.
Office Action for U.S. Appl. No. 13/534,023, mailed on Jan. 15, 2014, 19 pages.
International Preliminary Report on Patentability for International Application No. PCT/US2013/033384, mailed on Oct. 2, 2014, 6 pages.

* cited by examiner

DEVICE, SYSTEM AND METHOD OF ASSOCIATION BETWEEN WIRELESS COMMUNICATION DEVICES

BACKGROUND

A mobile device, e.g., a laptop computer, a notebook computer, a tablet, or the like, may be able to connect to a docking station. The docking station may enable the mobile device to utilize one or more peripheral devices, e.g., a keyboard, a mouse, a display, speakers and the like, which may be connected to the docking station. For example, a user may utilize the docking station to connect to an external keyboard, mouse and/or display, when working on the mobile device.

The docking station may include a physical connector to enable connecting the mobile device. Accordingly, the docking station may be required to be compatible to a type and/or product of the mobile device, to enable the physical connection of the mobile device to the docking station, e.g., using a cable, a Universal Serial Bus (USB) connection, and/or any other physical connection.

A wireless docking station may be configured to enable a wireless connection of the mobile device to the wireless docking station. The wireless connection may enable the user to connect the mobile device to the peripheral devices without physically connecting the mobile device to the docking station.

Accordingly, the wireless docking station may provide a convenient and easy to use connection to the peripheral devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
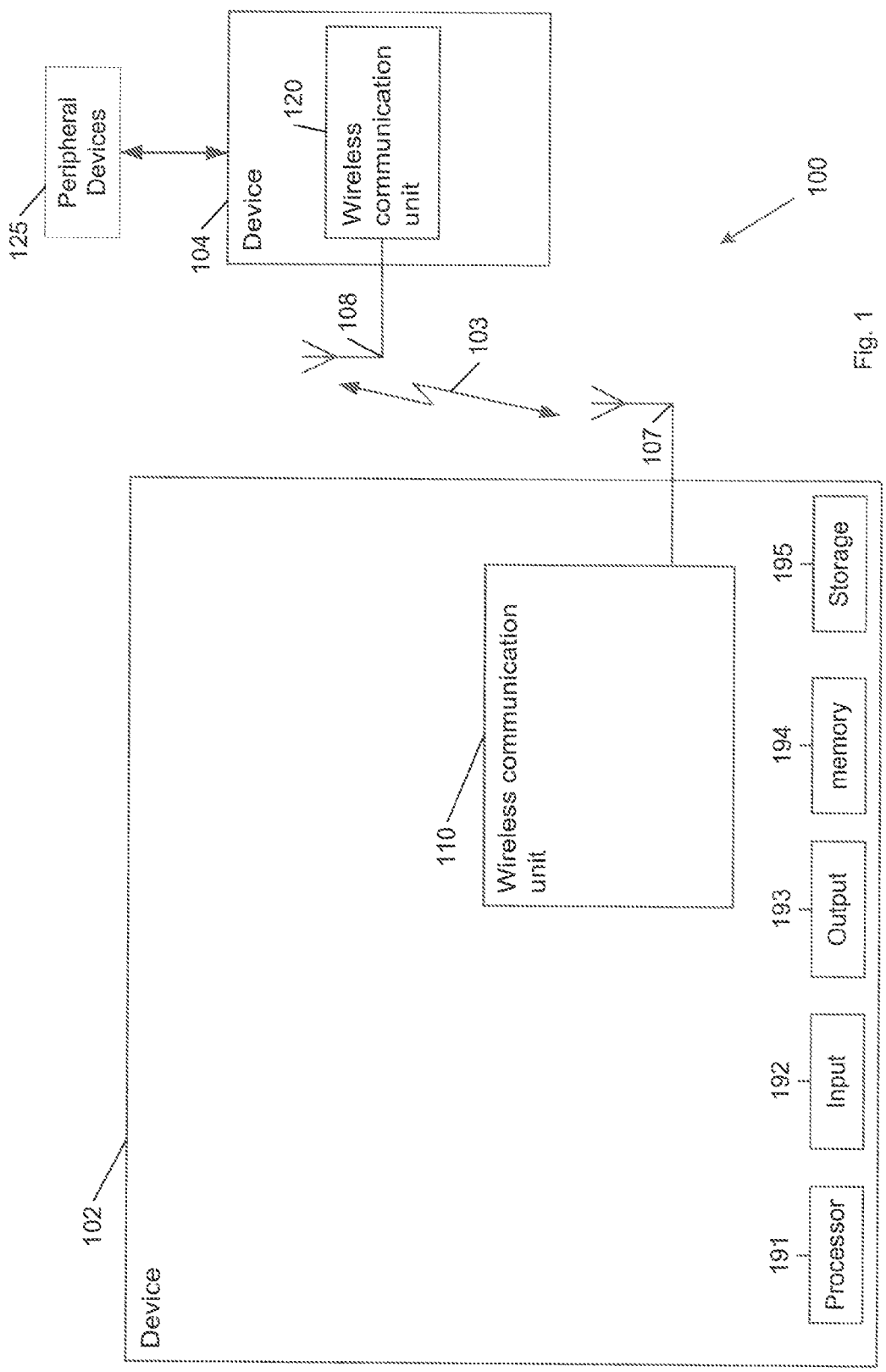
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing Wireless-Gigabit-Alliance (WGA) specifications (Wireless Gigabit Alliance, Inc WiGig MAC and PHY Specification Version 1.0, April 2010, Final specification) and/or future versions and/or derivatives thereof, devices and/or networks operating in accordance with existing IEEE 802.11 standards (IEEE 802.11-2007, IEEE Standard for Information Technology—Telecommunications and information exchange between systems—Local and metropolitan area networks—Specific requirements, Part 11: Wireless LAN Medium Access Control (MAC) and Physical Layer (PHY) Specifications; IEEE 802.11n-2009, IEEE Standard for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Higher Throughput; IEEE802.11 task group ac (TGac) ("IEEE802.11-09/0308r12—TGac Channel Model Addendum Document"), IEEE 802.11 task group ad (TGad) (IEEE P802.11ad/D1.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput in the 60 GHz Band), and/or future versions and/or derivatives thereof, devices and/or networks operating in accordance with existing IEEE 802.16 standards (IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m) and/or future versions and/or derivatives thereof, devices and/or networks operating in accordance with existing Wireless-WirelessHD™ specifications and/or future versions and/or derivatives thereof, units and/or devices which are part of the above networks, one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., Black-Berry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. For example, the antenna may include at least one of a phased array antenna, a single element antenna, a set of switched beam antennas, and the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The term "association", as used herein, may relate to a service used to establish access point/station (AP/STA) mapping. The association may enable, for example, STA invocation of distribution system services (DSSs).

The term "beamforming", as used herein, may relate to a spatial filtering mechanism, which may be used at a transmitter and/or a receiver to improve the received signal power or signal-to-noise ratio (SNR) at an intended receiver.

The phrase "directional band" (DBand), as used herein, may relate to a frequency band wherein the channel starting frequency is above 45 GHz.

The phrase "DBand antenna", as used herein, may relate to a phased array, a single element antenna, or a set of switched beam antennas covered by a quasi-omni antenna pattern.

The phrase "quasi-omni antenna pattern", as used herein, may include a DBand antenna operating with a widest practical beamwidth attainable for a particular antenna.

The phrase "Ultra Band (UB)", as used herein, may relate to the frequency band of 57-66 GHz.

The phrase "mmWave STA (STA)", as used herein, may relate to a STA having a radio transmitter, which is operating on a channel that is within the UB.

The phrase "personal basic service set" (PBSS), as used herein, may relate to a basic service set (BSS) that forms a self-contained network. For example, the PBSS may operate in the DBand, and may include one PBSS control point (PCP).

The phrase "PBSS control point" (PCP), as used herein, may include an entity that contains one station (STA) and coordinates access to the WM by STAs that are members of a PBSS.

The phrase "non-PCP station (STA)", as used herein, may relate to a STA that is not also a PCP.

The phrase "non-PCP/non-AP station (STA)", as used herein, may relate to a STA that is not a PCP and that is not an AP.

The phrase "PCP/AP", as used herein, may relate to a STA that is a PCP or an AP.

The phrase "Beacon interval", as used herein, may relate to a number of time units (TUs) between target beacon transmission times (TBTTs).

The phrase "beacon transmission interval" (BTI), as used herein, may relate to a time interval between the start of a first beacon transmission by a STA in a beacon interval to an end of a last beacon transmission by the STA in the same beacon interval.

The phrase "association beamforming training" (A-BFT), as used herein, may relate to a time allocated for a STA, following the BTI, to respond to beacons transmitted during the BTI, e.g., using a sector sweep.

The phrase "contention-based access period" (CBAP), as used herein, may relate to a time period within a data transfer time (DTT) of a BSS where two or more STA are allowed to communicate according to a contention-based mechanism.

The phrase "service period" (SP), as used herein, may relate to a contiguous time during which one or more down-link individually addressed frames are transmitted to a quality of service (QoS) AP or PCP station, and/or one or more transmission opportunities (TXOPs) are granted to the same STA. SP's are either scheduled or unscheduled.

The phrase "Peer-to-peer" (P2P) network, as used herein, may relate to a network in which a STA in the network can operate as a client or as a server for another STA in the network. The P2P network may allow shared access to resources, e.g., without a need for a central server.

The phrase "docking station", as used herein, may relate to an interface connected to one or more peripheral devices, e.g., a display, one or more speakers, a mouse, a keyboard and/or the like, configured to enable a device to connect to and communicate with the peripheral devices. For example, the docking station may be configured to enable a mobile device, e.g., a mobile computer, to connect to an external display and/or an external keyboard.

The phrases "power save" and "power save mode" as used herein may refer, for example, to reducing, diminishing, shutting down, powering off, turning off and/or switching off the electrical current to a device and/or component, and/or to switching the device and/or component to operate at a sleep mode, a reduced-power mode, a stand-by mode, an idle mode and/or any other operation mode, which consumes less power than required for full and/or normal operation of the device and/or component, e.g., for full reception, handling, decoding, transmitting and/or processing of wireless communication signals.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments include a device including a wireless communication unit to operate as a first station type selected from the group consisting of a network controller station and a non-network controller station, to associate with a wireless communication device operating as a second station type, different from the first station type, selected from the group consisting of the network controller station and the non-network controller station, and upon performing the association, to switch to operate as the second station type for communicating with the wireless communication device as the first station type.

In some demonstrative embodiments, the first station type may include the network controller station.

In some demonstrative embodiments, prior to associating with the wireless communication device, the wireless communication unit is to transmit a plurality of beacons in a plurality of directions, to switch to an omni-directional receive mode for receiving a response from the wireless communication device, and to switch to a power save mode, if a response is not received.

In some demonstrative embodiments, the device may include a mobile computing device.

In some demonstrative embodiments, the first station type may include the non-network controller station.

In some demonstrative embodiments, prior to associating with the wireless communication device, the wireless communication unit is to wait at an omni-directional receive state to receive a beacon from the wireless communication device.

In some demonstrative embodiments, the device may include a docking station.

In some demonstrative embodiments, the wireless communication unit is to switch to operate as the second station type by performing a handover process with the wireless communication device.

In some demonstrative embodiments, the network controller station may include a station selected from the group consisting of a personal basic service set control point (PCP) and an access point (AP), and wherein the non-network controller station may include a non-PCP/AP station.

In some demonstrative embodiments, the wireless communication unit is to associate with the wireless communication device over a millimeter-wave (mmwave) wireless communication band.

In some demonstrative embodiments, the wireless communication unit is to associate with the wireless communication device for forming a peer-to-peer (P2P) communication link.

Some demonstrative embodiments include a system including at least a first wireless communication device including one or more antennas; and a wireless communication unit to operate as a first station type selected from the group consisting of a network controller station and a non-network controller station, to associate with a second wireless communication device operating as a second station type, different from the first station type, selected from the group consisting of the network controller station and the non-network controller station, and upon performing the association, to switch to operate as the second station type for communicating with the second wireless communication device as the first station type.

Some demonstrative embodiments include a method including operating a first wireless communication device as a first station type selected from the group consisting of a network controller station and a non-network controller station; associating the first wireless communication device with a second wireless communication device operating as a second station type, different from the first station type, selected from the group consisting of the network controller station and the non-network controller station; and upon performing the association, switching to operate the first wireless communication device as the second station type for communicating with the second wireless communication device as the first station type.

In some demonstrative embodiments, the first station type may include the network controller station.

In some demonstrative embodiments, the method may include transmitting from the first wireless communication device a plurality of beacons in a plurality of directions; switching the first wireless communication device to an omni-directional receive mode for receiving a response from the second wireless communication device; and switching the first wireless communication device to a power save mode, if a response is not received.

In some demonstrative embodiments, the first station type may include the non-network controller station, and the associating may include waiting at an omni-directional receive state to receive a beacon from the second wireless communication device.

In some demonstrative embodiments, the network controller station may include a station selected from the group consisting of a personal basic service set control point (PCP) and an access point (AP), and wherein the non-network controller station comprises a non-PCP/AP station.

Some demonstrative embodiments include a non-transitory product including a storage medium having stored thereon instructions that, when executed by a machine, result in operating a first wireless communication device as a first station type selected from the group consisting of a network controller station and a non-network controller station; associating the first wireless communication device with a second wireless communication device operating as a second station type, different from the first station type, selected from the group consisting of the network controller station and the non-network controller station; and upon performing the association, switching to operate the first wireless communication device as the second station type for communicating with the second wireless communication device as the first station type.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 104, capable of communicating content, data, information and/or signals over one or more suitable wireless communication links 103, for example, a radio channel, an IR channel, a RF channel, a Wireless Fidelity (WiFi) channel, and the like.

In some demonstrative embodiments, wireless communication devices 102 and/or 104 may include wireless communication units 110 and/or 120, respectively, to perform wireless communication between wireless communication devices 102 and/or 104, and/or with one or more other wireless communication devices, e.g., as described below.

In some demonstrative embodiments, wireless communication units 110 and/or 120 include, for example, one or more wireless transmitters, receivers and/or transceivers able to send and/or receive wireless communication signals, RF signals, frames, blocks, transmission streams, packets, messages, data items, and/or data. For example, wireless communication units 110 and/or 120 may include or may be implemented as part of a wireless Network Interface Card (NIC), and the like.

In some demonstrative embodiments, wireless communication units 110 and/or 120 may include, or may be associated with, one or more antennas 107 and 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. For example, antennas 107 and/or 108 may include at least one of a phased array antenna, a single element antenna, a set of switched beam antennas, and the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, device 102 may include, or may be included as part of a mobile or portable device, for example, a mobile computer, a laptop computer, a notebook computer, a tablet computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, device 104 may include a non-mobile device. In other embodiments, device 104 may be implemented as a mobile device.

In some demonstrative embodiments, device 104 may include a wireless docking station connected to one or more peripheral devices 125 and configured to enable device 102 to utilize peripheral devices 125 in a wireless manner. Peripheral devices 125 may include, for example, a keyboard, a mouse, one or more speakers, a display, a Universal Serial Bus (USB) hub, and/or the like.

In some demonstrative embodiments, device 102 may perform the functionality of a non-AP/PCP STA, and device 104 may perform the functionality of an AP/PCP STA.

In some demonstrative embodiments, device 102 may associate with device 104 over a millimeter-wave (mmwave) wireless communication band, or any other communication band.

In some demonstrative embodiments, device 102 may associate with device 104 to form a peer-to-peer (P2P) communication link, e.g., to receive access to one or more resources and/or services provided by device 104.

In some demonstrative embodiments, device 102 may associate with device 104 to enable the utilization of one or more of peripheral devices 125.

In some demonstrative embodiments, device 102 may search and detect device 104, prior to associating with device 104.

In some demonstrative embodiments, searching and detecting device 104, e.g., when device 102 operates as a non-PCP/AP station, and device 104 operates as PCP/AP station, may require device 102 to wait in an omni-directional receive mode, until device 102 detects a beacon of a plurality of beacons, which may be transmitted from device 104 at a beacon interval. The omni-directional receive mode may include, for example, a mode of an antenna array, e.g., of antennas 107, in which a gain in every direction is approximately, e.g., within 2 dB, of a difference between a maximal gain of the antenna array in the direction and the array gain.

In some demonstrative embodiments, device 102 may wait in the omni-directional receive mode for a relatively long period of time, e.g., at least as long as device 104 is out of range from device 102.

In some demonstrative embodiments, device 102 may consume a relatively large amount of power, e.g., while waiting in the omni-directional receive mode. Device 104 may consume less power, e.g., compared to device 102, for example, since device 104 may be able to switch to a power save mode after the transmission of the plurality of beacons, e.g., for a remaining time of the beacon interval.

In some demonstrative embodiments, device 102 may be power constrained having a limited power source, while device 104 may not be power constrained, e.g., having an unlimited power source. For example, device 102 may include a mobile computer, e.g., a laptop, having a rechargeable battery, and device 104 may be connected to a power supply.

In some demonstrative embodiments, device 102 may be configured to perform the functionality of an AP/PCP station when attempting to associate with device 104, e.g., to reduce a power consumption of device 102, as described in detail below.

In some demonstrative embodiments, device 102 may operate as a first station type selected from a set of a network controller station and a non-network controller station. Device 102 may associate with device 104 operating as a second station type, different from the first station type, selected from the set of the network controller station and the non-network controller station. Upon performing the association, device 102 may switch to operate as the second station type for communicating with device 104 operating as the first station type, e.g., as described below.

In some demonstrative embodiments, device 102 may operate as the network controller station to associate with device 104 operating as the non-network controller station, and upon performing the association, device 102 may switch to operate as the non-network controller station for communicating with device 104 operating as the network controller station, e.g., as described below.

In some demonstrative embodiments, device 102 may operate as a PCP/AP, e.g., when attempting to associate with device 104, and device 104 may operate as a non-PCP/AP station, e.g., when attempting to associate with device 102.

In some demonstrative embodiments, device 102 may transmit, e.g., via antennas 107, a plurality of beacons in a plurality of directions configured to enable a detection of device 102 by device 104. In one example, wireless communication unit 110 may transmit, e.g., via antennas 107, 32 beacons in 32 directions for a predefined period of time of a beacon interval, e.g., a period of 100 milliseconds.

In some demonstrative embodiments, device 102 may switch to an omni-directional receive mode for receiving a response, e.g., in the form of one or more response packets, from device 104, e.g., in response to the plurality of beacons.

In some demonstrative embodiments, wireless communication unit 110 may switch to the omni-directional receive mode for a relatively short period of time of the beacon interval, e.g., an A-BFT period, for receiving the response beacon from device 104. For example, wireless communication unit 120 may control antennas 107 to operate in a quasi-omni antenna pattern for the A-BFT period.

In some demonstrative embodiments, device 102 may switch to a power save mode, if the response beacon is not received. For example, device 102 may switch to the power save mode, for example, after the time period of the BTI and the A-BFT, e.g., for a remaining time period of the beacon interval.

In some demonstrative embodiments, device 102 may continue to transmit the plurality of beacons in the plurality of directions until receiving the response beacon. For example, device 102 may transmit the beacons every BTI, e.g., in a beginning of the beacon interval, for example, after device 102 wakes up from the power save mode.

In some demonstrative embodiments, device 102 may control a size of the beacon interval, e.g., device 102 may increase or decrease the size of the beacon interval. For example, device 102 may increase the size of the beacon interval, e.g., if device 102 does not receive any response beacon for a relatively large number of beacon intervals, e.g., when device 104 is out of communication range of device 102. Increasing the size of the beacon interval may improve a power consumption of device 102, e.g., by increasing the period of the power save mode.

In some demonstrative embodiments, device 104 may wait at an omni-directional receive state to receive a beacon from device 102. For example, wireless communication unit 120 may be at the omni-directional receive state, e.g., by controlling antennas 108 to operate in a quasi-omni antenna pattern, until device 104 receives the beacon from device 102.

In some demonstrative embodiments, device 104 may receive, e.g., via antennas 108, a transmitted beacon of the plurality of beacons transmitted from device 102, and may transmit a response beacon, e.g., in response to the received beacon. In some demonstrative embodiments, device 102 may receive the response beacon and may associate with device 104.

In some demonstrative embodiments, upon completing the association, device 102 may switch to operate as the non-network controller station, e.g., the non-PCP/AP STA, and device 104 may switch to operate as the network controller, e.g., the PCP/AP STA.

In some demonstrative embodiments, device 102 may switch to operate as the non-network controller station by performing a handover process with device 104.

In one embodiment, the handover process may include device 102 transmitting a handover request to device 104; and device 104 responding with a handover response frame, e.g., having a handover result equal to zero. The handover process may also include device 102 transmitting beacons with a PCP handover element, e.g., including a BSS identifier (BSSID) of an old BSS, e.g., a BSS, which was defined by device 102 acting as the PCP/AP STA, a MAC address of device 104, which will be acting as a new PCP, and a remaining beacon interval time period until a completion of the handover process. The handover process may be completed, for example, upon transmission of a last Beacon of the beacons. In other embodiments, the handoff process may include any other sequence of operations.

In some demonstrative embodiments, upon completing the hand over process, devices 102 and 104 may communicate, e.g., when device 102 operates as the non-controller station, and device 104 operates as the controller station.

In one example, a user of device 102 may wish to utilize one or more of peripheral devices 125 connected to a wireless docking station, e.g., device 104. Device 102 may operate as a PCP/AP station to attempt to associate with the wireless docking station, which in turn may operate as a non-PCP/AP station. Upon detecting the wireless docking station, e.g., device 104, device 102 and the wireless docking station may associate. Upon completing the association, device 102 may switch to operate as the non-PCP/AP station, and the docking station may switch to operate as the PCP/AP station, e.g., to provide one or more resources to device 102, for example, network resources, access to one or more of peripheral devices 125 and/or any other resource. The user of device 102 may be able to utilize one or more of peripheral devices 125, e.g., an external keyboard, an external display and/or the like.

In some demonstrative embodiments, the communication between device 102 and 104, e.g., after device 102 switches to operate as the non-network controller station and device 104 switches to operate as the network controller, may be performed at a selected time for a relatively short duration, for example, during a SP and/or a CBAP.

In some demonstrative embodiments, device 102 may be able to switch to the power save mode, e.g., when device 102 is not performing communication with device 104. For example, device 102 may be at the power save mode during all periods except for the SP and/or the CBAP.

In some demonstrative embodiments, switching between operating as the first and the second station types may enable improving a power consumption of device 102. The switching between the functionality of the non-AP/PCP STA and the functionality of the PCP/AP STA may enable device 102 to utilize the power save capabilities of both of the non-AP/PCP and the PCP/AP functionalities. For example, device 102 may be able to utilize the power-save capabilities of the AP/PCP STA, e.g., prior to association, and the power save capabilities of the non-AP/PCP STA after association.

Wireless communication devices 102 and/or 104 may also include, for example, one or more of a processor 191, an input unit 192, an output unit 193, a memory unit 194, and a storage unit 195. Wireless communication devices 102 and/or 104 may optionally include other suitable hardware components and/or software components. In some demonstrative embodiments, some or all of the components of one or more of wireless communication devices 102 and/or 104 may be enclosed in a common housing or packaging, and may be interconnected or operably associated using one or more wired or wireless links. In other embodiments, components of one or more of wireless communication devices 102 and/or 104 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication device 101, and/or of one or more suitable applications.

Input unit 192 includes, for example, a keyboard, a keypad, a mouse, a touch screen a touch-pad, a track-ball, a stylus, a microphone, or other suitable pointing device or input device. Output unit 193 includes, for example, a monitor, a screen, a touch screen a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication devices 102 and/or 104.

Figure 2A:
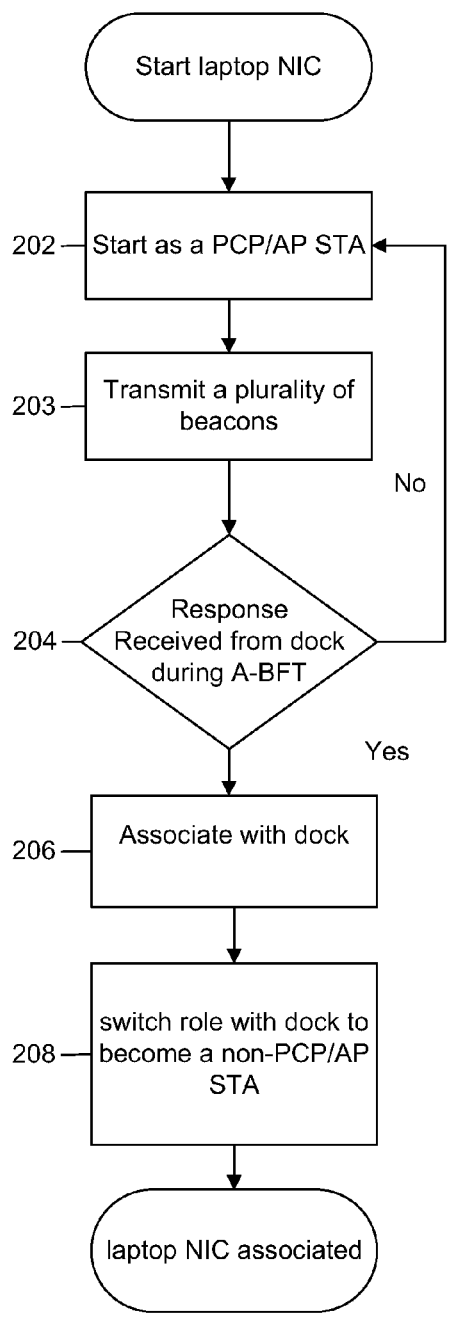
FIGS. 2A and 2B are flowchart illustrations of a method of associating between a mobile device and a docking station, in accordance with some demonstrative embodiments.
Figure 2B:
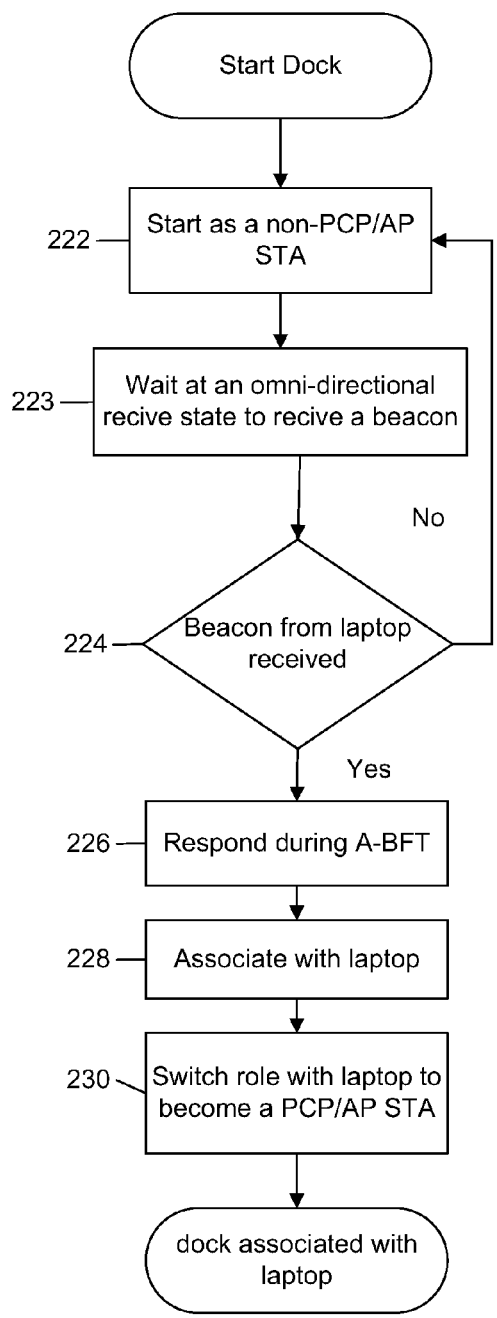

Reference is made to FIGS. 2A and 2B, which schematically illustrate a method of association between a mobile device, e.g., a laptop, and a wireless docking station (dock). In some demonstrative embodiments, one or more of the operations of the method of FIG. 2A may be preformed by the mobile device, and one or more of the operations of the method of FIG. 2B may be preformed by the wireless docking station. In some embodiments, one or more of the operations of the method of FIGS. 2A and/or 2B may be performed by any suitable wireless communication system, e.g., system 100 (FIG. 1); wireless communication device, e.g., devices 102 and/or 104 (FIG. 1); and/or wireless communication unit, e.g., wireless communication units 110 and/or 120 (FIG. 1).

As indicated at block 202, the method may include operating the mobile device as a PCP/AP STA. For example, device 102 (FIG. 1) may operate as a network controller station, for example, a PCP/AP station, e.g., as described above.

As indicated at block 222, the method may include operating the wireless docking station as a non-PCP/AP STA. For example, device 104 (FIG. 1) may operate as a non-network controller station, for example, a non-PCP/AP station, e.g., as described above.

As indicated at block 203, the method may include transmitting a plurality of beacons in a plurality of directions. For example, device 102 (FIG. 1) may transmit a plurality of beacons in a plurality of directions, e.g., as described above.

As indicated at block 223, the method may include waiting at an omni-directional receive state to receive a beacon. For example, device 104 (FIG. 1) may wait at the omni-directional receive state to receive a beacon of the plurality of beacons transmitted from device 102, e.g., as described above.

As indicated at block 224, the method may include determining whether or not a transmitted beacon from the mobile device was received. For example, device 104 (FIG. 1) may determine whether the beacon was received from device 102 (FIG. 1), e.g., as described above.

As indicated at block 226, the method may include responding during an A-BFT, e.g., if the beacon from the mobile device was received. For example, device 104 (FIG. 1) may transmit a response beacon to device 102 (FIG. 1) during the A-BFT, e.g., upon receiving the transmitted beacon from device 102 (FIG. 1), e.g., as described above.

As indicated at block 204, the method may include attempting to receive a response beacon from the wireless docking station during the A-BFT. For example, device 102 (FIG. 1) may switch to the omni-directional receive mode during the A-BFT for receiving the response beacon from device 104 (FIG. 1), e.g., as described above.

As indicated at block 206, the method may include associating with the wireless docking station, e.g., if the response beacon is received during the A-BFT. For example, device 102 (FIG. 1) may associate with device 104 (FIG. 1), e.g., upon device 102 (FIG. 1) receiving the response beacon from device 104 (FIG. 1), e.g., as described above.

As indicated at block 228, the method may include associating with the mobile device. For example, device 104 (FIG. 1) may associate with device 102 (FIG. 1), e.g., as described above.

As indicated at block 208, the method may include switching functionalities with the wireless docking station, and operating as a non-PCP STA. For example, device 102 (FIG. 1) may perform a handover process with device 104 (FIG. 1), and may switch to operate as the non-network controller station, e.g., as described above.

As indicated at block 230, the method may include switching functionalities with the mobile device, and operating as a PCP/AP STA. For example, device 104 (FIG. 1) may perform the handover process with device 102 (FIG. 1) and may switch to operate as the network controller station, e.g., as described above.

Figure 3:
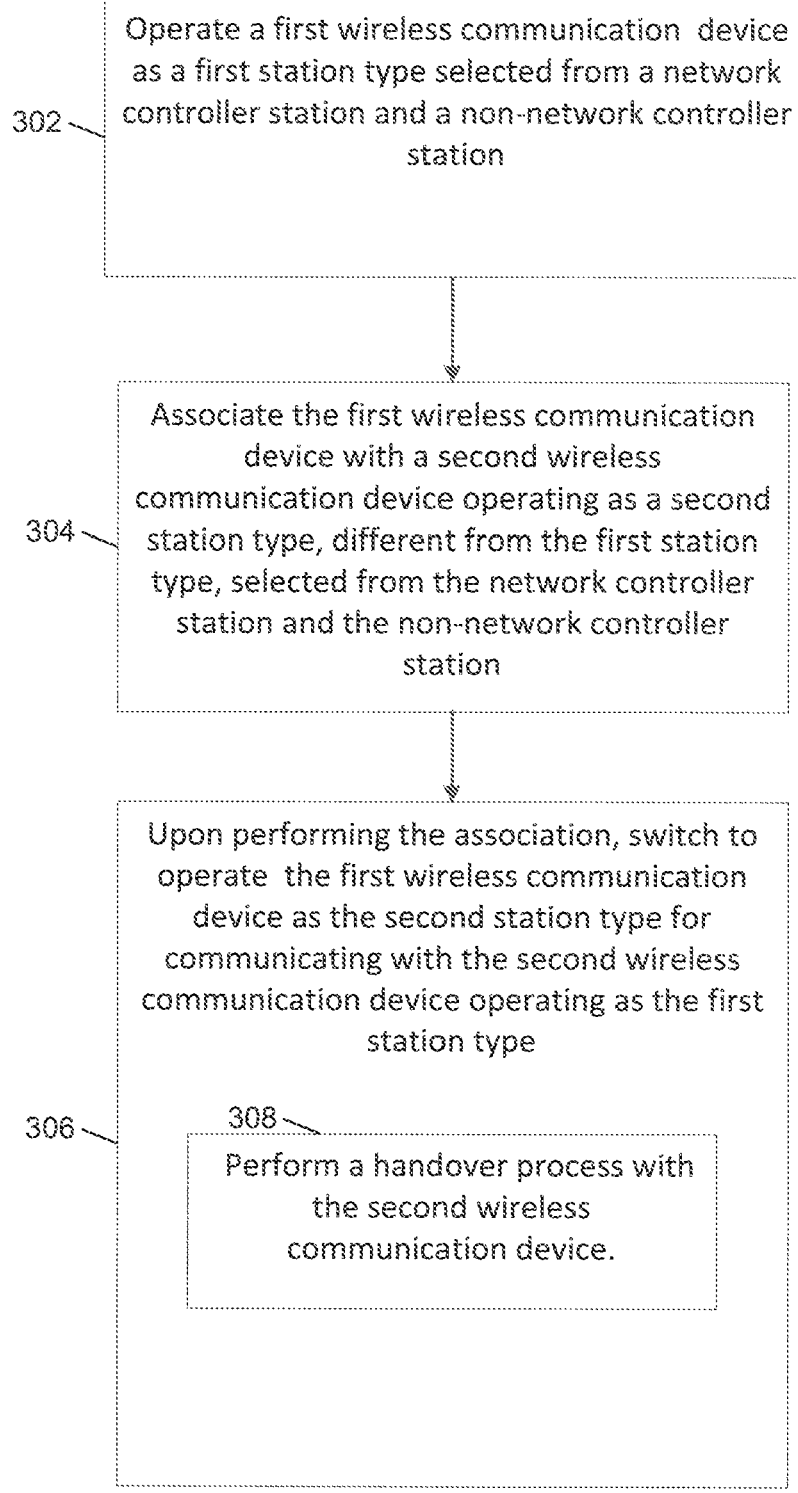
FIG. 3 is a schematic illustration of a method of association between wireless communication devices, in accordance with some demonstrative embodiments.

Reference is made to FIG. 3, which schematically illustrates a method of wireless communication, in accordance with some demonstrative embodiments. In some embodiments, one or more of the operations of the method of FIG. 3 may be performed by any suitable wireless communication system e.g., system 100 (FIG. 1); wireless communication device, e.g., devices 102 and/or 104 (FIG. 1); and/or wireless communication unit, e.g., wireless communication units 110 and/or 120 (FIG. 1).

As indicated at block 302, the method may include operating a first wireless communication device as a first station type selected from a network controller station and a non-network controller station. For example, wireless communication unit 110 (FIG. 1) may operate as a network controller station, e.g., as described above.

As indicated at block 304, the method may include associating the first wireless communication device with a second wireless communication device operating as a second station type, different from the first station type, selected from the network controller station and the non-network controller station. For example, device 102 (FIG. 1) may associate with device 104 (FIG. 1) operating as the non-network controller, e.g., as described above.

As indicated at block 306, the method may include, upon performing the association, switching to operate the first wireless communication device as the second station type for communicating with the second wireless communication device operating as the first station type. For example, device 102 (FIG. 1) may switch to operate as the non-network controller station for communicating with device 104 (FIG. 1) operating as the network controller station, e.g., as described above.

As indicated at block 308, switching to operate the first wireless communication device as the second station type may include performing a handover process with the second wireless communication device. For example, device 102 (FIG. 1) may switch to operate as the non-network controller by performing a handover process with device 104 (FIG. 1), e.g., as described above.

Figure 4:
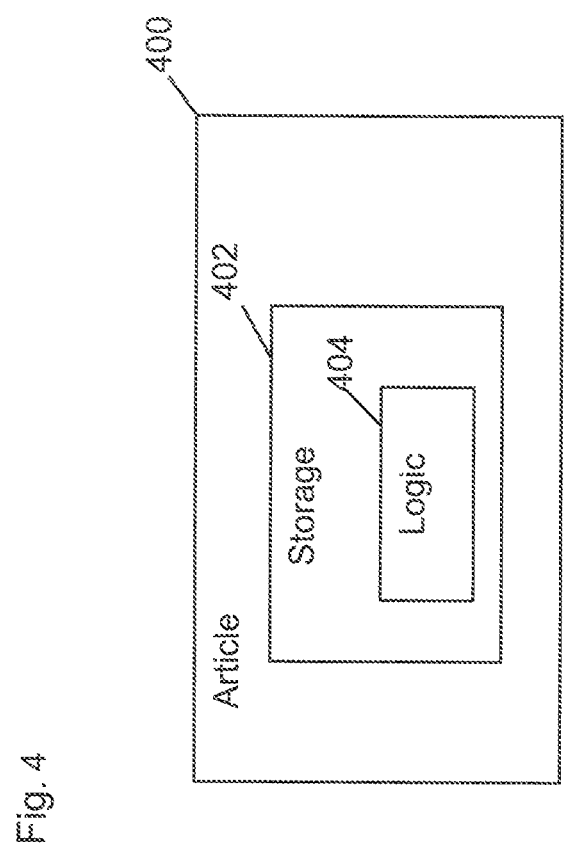
FIG. 4 is a schematic illustration of an article of manufacture, in accordance with some demonstrative embodiments.

Reference is made to FIG. 4, which schematically illustrates an article of manufacture 400, in accordance with some demonstrative embodiments. Article 400 may include a non-transitory machine-readable storage medium 402 to store logic 404, which may be used, for example, to perform at least part of the functionality of wireless communication unit 110 (FIG. 1), wireless communication device 102 (FIG. 1), wireless communication unit 120 (FIG. 1) and/or wireless communication device 104 (FIG. 1); and/or to perform one or more operations of the methods of FIGS. 2A, 2B and/or FIG. 3. The phrase "non-transitory machine-readable medium" is directed to include all computer-readable media, with the sole exception being a transitory propagating signal.

In some demonstrative embodiments, article 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A device comprising:
a wireless communication unit including a transmitter and a receiver, the wireless communication unit to operate as a first station type selected from the group consisting of a network controller station and a non-network controller station, to associate with a wireless communication device operating as a second station type, different from the first station type, selected from the group consisting of the network controller station and the non-network controller station, and upon performing said association, to switch to operate as the second station type for communicating with the wireless communication device as the first station type.

2. The device of claim 1, wherein said first station type comprises said network controller station.

3. The device of claim 2, wherein, prior to associating with said wireless communication device, said wireless communication unit is to transmit a plurality of beacons in a plurality of directions, to switch to an omni-directional receive mode for receiving a response from the wireless communication device, and to switch to a power save mode, if a response is not received.

4. The device of claim 2 comprising a mobile computing device.

5. The device of claim 1, wherein said first station type comprises said non-network controller station.

6. The device of claim 5, wherein, prior to associating with said wireless communication device, said wireless communication unit is to wait at an omni-directional receive state to receive a beacon from the wireless communication device.

7. The device of claim 5 comprising a wireless docking station.

8. The device of claim 1, wherein the wireless communication unit is to switch to operate as the second station type by performing a handover process with the wireless communication device.

9. The device of claim 1, wherein said network controller station comprises a station selected from the group consisting of a personal basic service set control point (PCP) and an access point (AP), and wherein the non-network controller station comprises a non-PCP/AP station.

10. The device of claim 1, wherein said wireless communication unit is to associate with said wireless communication device over a millimeter-wave (mmwave) wireless communication band.

11. The device of claim 1, wherein said wireless communication unit is to associate with said wireless communication device for forming a peer-to-peer (P2P) communication link.

12. A system comprising:
at least a first wireless communication device comprising:
one or more antennas; and
a wireless communication unit to operate as a first station type selected from the group consisting of a network controller station and a non-network controller station, to associate with a second wireless communication device operating as a second station type, different from the first station type, selected from the group consisting of the network controller station and the non-network controller station, and upon performing said association, to switch to operate as the second station type for communicating with the second wireless communication device as the first station type.

13. The system of claim 12, wherein said first station type comprises said network controller station.

14. The system of claim 13, wherein, prior to associating with said second wireless communication device, said first wireless communication device is to transmit a plurality of beacons in a plurality of directions, to switch to an omni-directional receive mode for receiving a response from the second wireless communication device, and to switch to a power save mode, if a response is not received.

15. The system of claim 13, wherein said first wireless communication device comprises a mobile computing device.

16. The system of claim 12, wherein said first station type comprises said non-network controller station, and wherein, prior to associating with said second wireless communication device, said first wireless communication device is to wait at an omni-directional receive state to receive a beacon from the second wireless communication device.

17. The system of claim 16, wherein said first wireless communication device comprises a wireless docking station.

18. The system of claim 12, wherein said network controller station comprises a station selected from the group consisting of a personal basic service set control point (PCP) and an access point (AP), and wherein the non-network controller station comprises a non-PCP/AP station.

19. A method comprising:
operating a first wireless communication device as a first station type selected from the group consisting of a network controller station and a non-network controller station;
associating the first wireless communication device with a second wireless communication device operating as a second station type, different from the first station type, selected from the group consisting of the network controller station and the non-network controller station; and
upon performing said association, switching to operate the first wireless communication device as the second station type for communicating with the second wireless communication device as the first station type.

20. The method of claim 19, wherein said first station type comprises said network controller station.

21. The method of claim 20 comprising:
transmitting from the first wireless communication device a plurality of beacons in a plurality of directions;
switching the first wireless communication device to an omni-directional receive mode for receiving a response from the second wireless communication device; and
switching the first wireless communication device to a power save mode, if a response is not received.

22. The method of claim 19, wherein said first station type comprises said non-network controller station, and wherein said associating comprises waiting at an omni-directional receive state to receive a beacon from the second wireless communication device.

23. The method of claim 19, wherein said network controller station comprises a station selected from the group consisting of a personal basic service set control point (PCP) and an access point (AP), and wherein the non-network controller station comprises a non-PCP/AP station.

24. A product including a non-transitory storage medium having stored thereon instructions that, when executed by a machine, result in:
operating a first wireless communication device as a first station type selected from the group consisting of a network controller station and a non-network controller station;
associating the first wireless communication device with a second wireless communication device operating as a second station type, different from the first station type, selected from the group consisting of the network controller station and the non-network controller station; and
upon performing said association, switching to operate the first wireless communication device as the second station type for communicating with the second wireless communication device as the first station type.

25. The product of claim 24, wherein said first station type comprises said network controller station.

26. The product of claim 25, wherein said instructions result in:
transmitting from the first wireless communication device a plurality of beacons in a plurality of directions;
switching the first wireless communication device to an omni-directional receive mode for receiving a response from the second wireless communication device; and
switching the first wireless communication device to a power save mode, if a response is not received.

27. The product of claim 24, wherein said first station type comprises said non-network controller station, and wherein said instructions result in waiting at an omni-directional receive state to receive a beacon from the second wireless communication device.

28. The product of claim 24, wherein said network controller station comprises a station selected from the group consisting of a personal basic service set control point (PCP) and an access point (AP), and wherein the non-network controller station comprises a non-PCP/AP station.

* * * * *